(12) United States Patent
Ogura

(10) Patent No.: US 7,412,885 B2
(45) Date of Patent: *Aug. 19, 2008

(54) VIBRATING GYRO ELEMENT, SUPPORT STRUCTURE OF VIBRATING GYRO ELEMENT, AND GYRO SENSOR

(75) Inventor: Seiichiro Ogura, Minowa-machi (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/329,691

(22) Filed: Jan. 10, 2006

(65) Prior Publication Data

US 2006/0107739 A1 May 25, 2006

(30) Foreign Application Priority Data

Jan. 20, 2005 (JP) ............... 2005-012418

(51) Int. Cl.
  *G01P 9/04* (2006.01)
  *H01L 41/08* (2006.01)
(52) U.S. Cl. ............. 73/504.12; 73/504.16; 310/370
(58) Field of Classification Search ............. 73/504.04, 73/504.12, 504.14, 504.15, 504.16; 310/370
See application file for complete search history.

(56) References Cited

U.S. PATENT DOCUMENTS

| | | | |
|---|---|---|---|
| 5,476,008 A * | 12/1995 | Pinson | 73/504.16 |
| 5,998,911 A | 12/1999 | Kikuchi et al. | |
| 6,018,212 A | 1/2000 | Kikuchi et al. | |
| 6,186,003 B1 | 2/2001 | Kikuchi et al. | |
| 6,227,048 B1 | 5/2001 | Kikuchi et al. | |
| 6,346,765 B1 | 2/2002 | Kikuchi et al. | |
| 6,437,483 B2 | 8/2002 | Kikuchi et al. | |
| 6,439,051 B2 * | 8/2002 | Kikuchi et al. | 73/504.12 |
| 6,651,498 B1 | 11/2003 | Kikuchi et al. | |
| 6,698,292 B2 * | 3/2004 | Kikuchi | 73/662 |
| 6,747,393 B2 | 6/2004 | Kikuchi et al. | |

(Continued)

FOREIGN PATENT DOCUMENTS

JP   10-160478   6/1998

(Continued)

OTHER PUBLICATIONS

2 Office Actions issued by the Japanese Patent Office in the corresponding Japanese application, citing the above references.

*Primary Examiner*—Helen C. Kwok
(74) *Attorney, Agent, or Firm*—Baker & Hostetler, LLP

(57) ABSTRACT

A vibrating gyro element includes in the same plane a base portion; a pair of vibrating arms for detection extended out of the base portion on both sides in a straight line shape; a pair of connecting arms extended-out from the base portion onto both sides in directions perpendicular to the vibrating arms for detection; a pair of vibrating arms for driving each extended-out from the tip portion of each of the connecting arms to both sides perpendicularly to this tip portion; two pairs of beams extended out of the base portion along the respective arms for detection; and a pair of support portions to which the respective beams extended out in the same direction are connected; wherein the support portion is arranged outside the vibrating arm for detection between the vibrating arms for driving in the extending-out direction of each of the vibrating arms for detection.

7 Claims, 5 Drawing Sheets

U.S. PATENT DOCUMENTS

| | | |
|---|---|---|
| 6,858,972 B2 | 2/2005 | Kikuchi et al. |
| 7,015,631 B2 | 3/2006 | Hirasawa et al. |
| 7,043,986 B2 * | 5/2006 | Kikuchi et al. ............ 73/504.12 |
| 7,150,386 B2 | 12/2006 | Ishikawa et al. |
| 2006/0226741 A1 | 10/2006 | Ogura |

FOREIGN PATENT DOCUMENTS

| | | |
|---|---|---|
| JP | 11-173857 | 7/1999 |
| JP | 2001-012955 | 1/2001 |
| JP | 2001-194154 | 7/2001 |
| JP | 2003-294450 | 10/2003 |
| JP | 2004-085575 A | 3/2004 |

* cited by examiner

F I G. 9
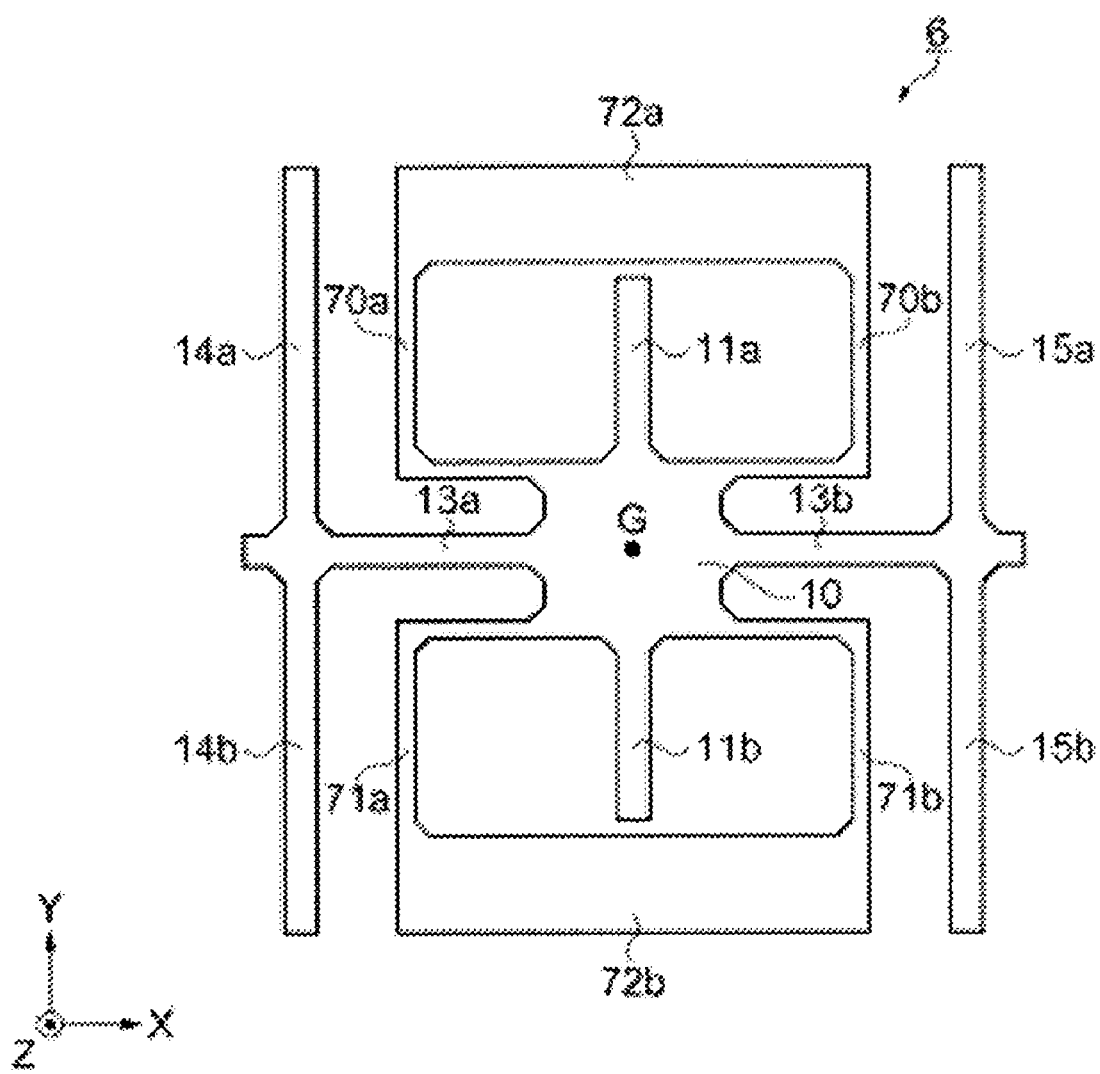

VIBRATING GYRO ELEMENT, SUPPORT STRUCTURE OF VIBRATING GYRO ELEMENT, AND GYRO SENSOR

BACKGROUND

1. Technical Field

The present invention relates to a vibrating gyro element, a support structure of the vibrating gyro element, and a gyro sensor used in the detection of an angular velocity.

2. Related Art

In recent years, the gyro sensor having the vibrating gyro element stored in a container is largely used as a manual moving correction of an image pickup device, posture control of a mobile navigation system of a vehicle, etc. using a GPS satellite signal.

For example, a so-called double T-type vibrating gyro element is known as the vibrating gyro element in JP-A-2001-12955 and FIG. 1. In this double T-type vibrating gyro element, a driving vibrating system of about the T-type is arranged in left-right symmetry with respect to a central detecting vibrating system.

In these gyro sensors, there is a request of compactness to improve portability and the degree of freedom of a device design. It is necessary to make the gyro element compact so as to make this gyro sensor compact. With respect to support of the gyro element, a central base portion (gravity center portion) of the gyro element is normally adhered and supported in a substrate, etc. However, as the gyro element is made compact, a problem exists in that a support area with respect to the substrate is also reduced and no strength can be secured when a vibration or an impact is applied. Therefore, for example, as shown in JP-A-2001-12955 (FIG. 4), a structure for extending a support frame out of the base portion and respectively supporting the base portion and the support frame is proposed.

However, in this former gyro element, a detecting vibration is suppressed by supporting the base portion, and detecting sensitivity of the angular velocity is reduced. Further, since the support frame is arranged outside the driving vibrating system and the detecting vibrating system of the gyro element, there is a limit in the compact formation of the gyro element.

SUMMARY

An advantage of some aspects of the invention is to provide a vibrating gyro element, a support structure of the vibrating gyro element, and a gyro sensor for maintaining the detecting sensitivity of the angular velocity of the vibrating gyro element, and securing the support strength and able to be made compact.

To achieve the above advantage, a vibrating gyro element of the invention comprises in the same plane:

a base portion;

a pair of vibrating arms for detection extended out of the base portion on both sides in a straight line shape;

a pair of connecting arms extended-out from the base portion onto both sides in directions perpendicular to the vibrating arms for detection;

a pair of vibrating arms for driving each extended-out from the tip portion of each of the connecting arms to both sides perpendicularly to this tip portion;

two pairs of beams extended out of the base portion along the respective arms for detection; and a pair of support portions to which the respective beams extended out in the same direction are connected;

wherein the support portion is arranged outside the vibrating arm for detection between the vibrating arms for driving in the extending-out direction of each of the vibrating arms for detection.

In accordance with this construction, the area of the support portion can be largely secured by forming the beam extended out of the base portion of the vibrating gyro element, and the support portion for connecting this beam. Thus, support strength can be improved by adhering and supporting this support portion while maintaining the detecting sensitivity of the angular velocity. Further, the vibrating gyro element can be made compact by arranging the support portion outside the vibrating arm for detection between the vibrating arms for driving in the extending-out direction of the vibrating arm for detection.

The vibrating gyro element of the invention is also characterized in that the length of the vibrating arm for detection is formed so as to be shorter than the length of the vibrating arm for driving.

In accordance with such a construction, the area of the support portion can be increased, and the support strength of the vibrating gyro element can be improved.

The vibrating gyro element of the invention is also characterized in that the pair of support portions are arranged in positions of rotation symmetry with respect to the center of gravity of the vibrating gyro element.

In accordance with this construction, the balance of the vibrating gyro element can be secured, and a stable posture can be held.

A support structure of a vibrating gyro element in the invention comprises:

the above vibrating gyro element;

a support base for placing the vibrating gyro element thereon; and a fixing member for fixing the support portion of the vibrating gyro element and the support base.

In accordance with this construction, since the area of the support portion can be largely formed, the support portion is supported by the fixing member without supporting the base portion of the vibrating gyro element. Thus, the support portion can be reliably supported while maintaining the detecting sensitivity of the angular velocity.

The support structure of the vibrating gyro element in the invention is also characterized in that the fixing member is constructed by a material having elasticity.

In accordance with this construction, since the fixing member has elasticity, a vibration or an impact from the exterior is relaxed, and the driving vibration and the detecting vibration of the vibrating gyro element can be stably held. With respect to a micro vibration coming to be leaked to the support portion, the fixing member functions as a buffer material, and an influence onto the driving vibration and the detecting vibration can be reduced.

A gyro sensor of the invention comprises:

the above vibrating gyro element;

a support base for placing the vibrating gyro element thereon;

a fixing member for fixing the support portion of the vibrating gyro element and the support base;

a driving circuit for operating and vibrating the vibrating gyro element; and a detecting circuit for detecting a detecting vibration caused in the vibrating gyro element when an angular velocity is applied to the vibrating gyro element.

In accordance with this construction, support strength is improved by adhering and supporting the support portion of the vibrating gyro element while maintaining the detecting sensitivity of the angular velocity. Further, it is possible to provide a gyro sensor which mounts the vibrating gyro element made compact and is made compact.

BRIEF DESCRIPTION OF THE DRAWINGS

The invention will be described with reference to the accompanying drawings, wherein like numbers reference like elements.

FIG. 9 is a schematic plan view showing a modified example of the vibrating gyro element.

DESCRIPTION OF EXEMPLARY EMBODIMENTS

Embodiment modes for embodying the invention will next be explained in accordance with the drawings.

Embodiment Mode

Figure 1:
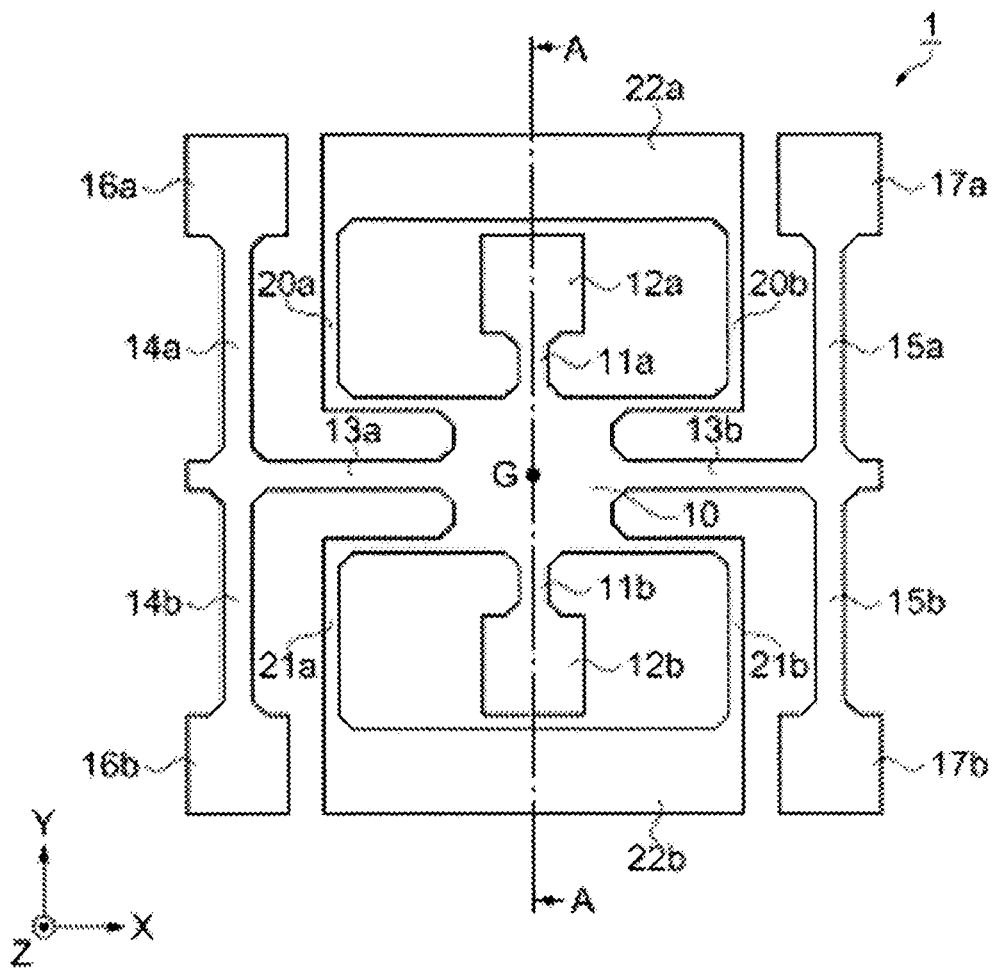
FIG. 1 is a schematic plan view showing a vibrating gyro element of this embodiment mode.

FIG. 1 is a schematic plan view showing a vibrating gyro element of this embodiment mode.

The vibrating gyro element 1 is formed from crystal as a piezoelectric material. The crystal has an X-axis called an electric axis, a Y-axis called a mechanical axis, and a Z-axis called an optical axis. The vibrating gyro element 1 has a predetermined thickness in the Z-axis direction, and is formed within an XY plane.

The vibrating gyro element 1 has a pair of vibrating arms 11a, 11b for detection extended out of a base portion 10 in a straight line shape on both the upper and lower sides within FIG. 1, and also has a pair of connecting arms 13a, 13b extended out of the base portion 10 on both the left and right sides within FIG. 1 in directions perpendicular to the vibrating arms 11a, 11b for detection. The vibrating gyro element 1 further has pairs of left and right vibrating arms 14a, 14b, 15a, 15b for driving extended out of the tip portions of the respective connecting arms 13a, 13b on both the upper and lower sides within FIG. 1 in parallel with the vibrating arms 11a, 11b for detection.

Further, unillustrated detecting electrodes are formed on the surfaces of the vibrating arms 11a, 11b for detection. Unillustrated driving electrodes are formed on the surfaces of the vibrating arms 14a, 14b, 15a, 15b for driving. Thus, a detecting vibrating system for detecting an angular velocity is constructed by the vibrating arms 11a, 11b for detection. A driving vibrating system for operating the vibrating gyro element is constructed by the connecting arms 13a, 13b and the vibrating arms 14a, 14b, 15a, 15b for driving.

Weight portions 12a, 12b are formed in the respective tip portions of the vibrating arms 11a, 11b for detection, and weight portions 16a, 16b, 17a, 17b are formed in the respective tip portions of the vibrating arms 14a, 14b, 15a, 15b for driving so that detecting sensitivity of the angular velocity is improved. Here, the vibrating arms 11a, 11b for detection are terms respectively including the weight portions 12a, 12b, and the vibrating arms 14a, 14b, 15a, 15b for driving are terms respectively including the weight portions 16a, 16b, 17a, 17b.

Further, the vibrating arms 11a, 11b for detection are formed so as to be shorter in length than the vibrating arms 14a, 14b, 15a, 15b for driving.

Further, a pair of beams 20a, 20b of an L-shape are formed so as to be extended out of the base portion 10 on both the left and right sides within FIG. 1 in a direction perpendicular to the vibrating arm 11a for detection, and be intermediately extended out in parallel with the vibrating arm 11a for detection. Both the tips of the beams 20a, 20b are connected to a support portion 22a. Similarly, a pair of beams 21a, 21b of an L-shape are formed so as to be extended out of the base portion 10 on both the left and right sides within FIG. 1 in a direction perpendicular to the vibrating arm 11b for detection, and be intermediately extended out in parallel with the vibrating arm 11b for detection. Both the tips of the beams 21a, 21b are connected to a support portion 22b.

This pair of support portions 22a, 22b are arranged outside the vibrating arms 11a, 11b for detection between the vibrating arms 14a, 14b, 15a, 15b for driving in the extending-out direction of each of the vibrating arms 11a, 11b for detection. Further, this pair of support portions 22a, 22b are arranged in positions of rotation symmetry with respect to the gravity center G of the vibrating gyro element 1.

The operation of the vibrating gyro element 1 will next be explained.

Figure 3:
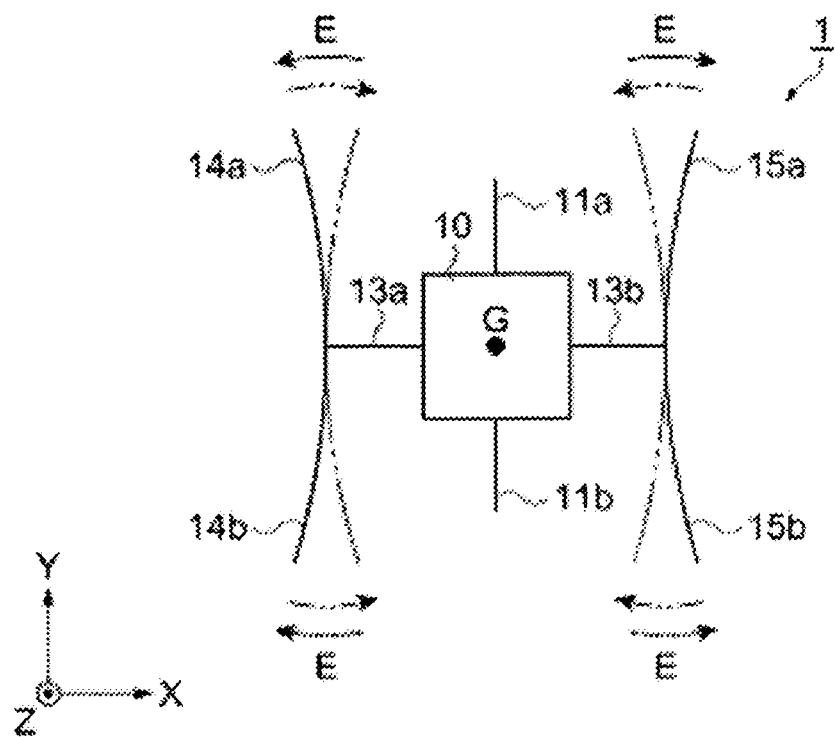
FIG. 3 is a typical plan view for explaining a driving vibrating state of the vibrating gyro element.
Figure 4:
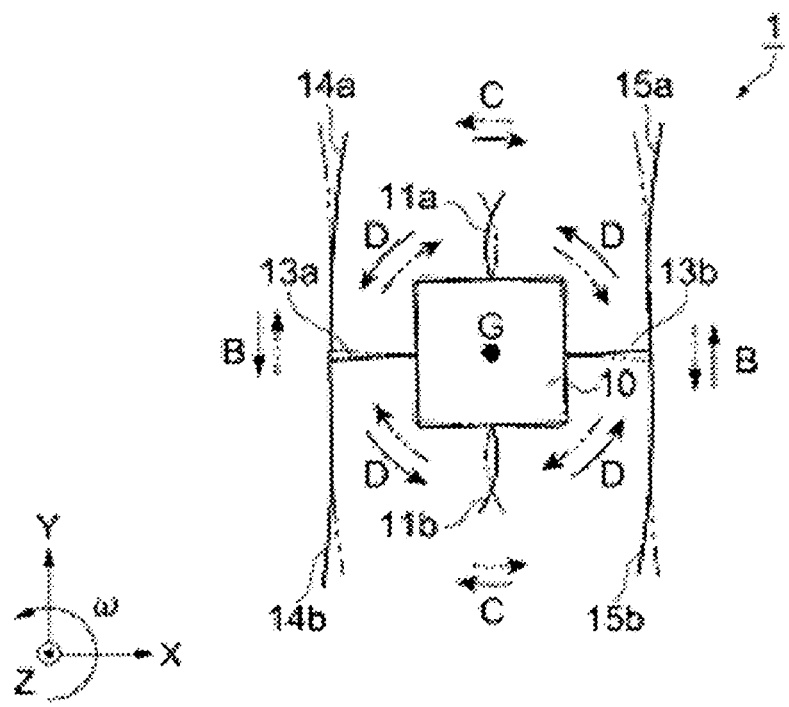
FIG. 4 is a typical plan view for explaining a detecting vibrating state of the vibrating gyro element.

FIGS. 3 and 4 are typical plan views for explaining the operation of the vibrating gyro element. In FIGS. 3 and 4, each vibrating arm is shown by a line to simply represent a vibrating mode, and the beams 20a, 20b, 21a, 21b and the support portions 22a, 22b mentioned above are omitted.

In FIG. 3, the driving vibrating mode of the vibrating gyro element 1 will be explained. In a state in which no angular velocity is applied to the vibrating gyro element 1, the vibrating arms 14a, 14b, 15a, 15b for driving perform a bending vibration in the direction shown by an arrow E. In this bending vibration, a vibrating posture mode shown by a solid line and a vibrating posture mode shown by a two-dotted chain line are repeated at a predetermined frequency. At this time, the vibrating arms 14a, 14b for driving and the vibrating arms 15a, 15b for driving perform the vibration of line symmetry with respect to the Y-axis passing through the gravity center G. Therefore, the base portion 10, the connecting arms 13a, 13b and the vibrating arms 11a, 11b for detection are almost not vibrated.

When the angular velocity ω around the Z-axis is applied to the vibrating gyro element 1 in a state in which this driving vibration is performed, the vibration as shown in FIG. 4 is performed. Namely, Coriolis force in the direction of an arrow B is applied to the vibrating arms 14a, 14b, 15a, 15b for driving and the connecting arms 13a, 13b constituting the driving vibrating system, and a new vibration is excited. This vibration in the direction of the arrow B is a circumferential vibration with respect to the gravity center G. Simultaneously, in the vibrating arms 11a, 11b for detection, a detecting vibration in the direction of an arrow C is excited in accordance with the vibration of the arrow B. A detecting electrode formed in the vibrating arms 11a, 11b for detection then detects the distortion of a piezoelectric material generated by this vibration, and the angular velocity is calculated.

At this time, a peripheral portion of the base portion 10 is vibrated in the circumferential direction with respect to the gravity center G in the direction of an arrow D. This is because the detecting vibration becomes a balance vibration including the base portion 10 as well as the balance vibration of the driving vibrating system and the vibrating arms 11a, 11b for detection. The vibrating amplitude of the peripheral portion of the base portion 10 shown by this arrow D is very small in comparison with the vibrating amplitude of the driving vibrating system shown by the arrow B, or the vibrating amplitudes of the vibrating arms 11a, 11b for detection shown by the arrow C. However, for example, when the base portion 10 is adhered and fixed, the vibration of the peripheral portion of the base portion 10 is suppressed by this fixation, and the detecting vibration is also suppressed. Thus, the detecting sensitivity of the angular velocity is reduced by supporting the base portion 10.

Figure 2:
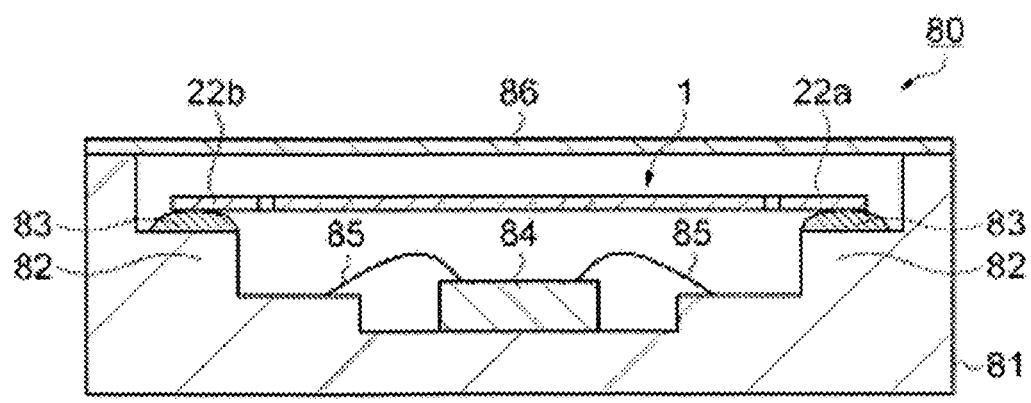
FIG. 2 is a schematic sectional view showing a gyro sensor.

The support structure of the vibrating gyro element and the gyro sensor will next be explained by using FIG. 2. FIG. 2 is a schematic sectional view showing the gyro sensor, and the vibrating gyro element 1 is shown in section along a cutting line A-A of FIG. 1.

The gyro sensor 80 has the vibrating gyro element 1, an IC 84, a storing container 81 and a cover body 86. The IC 84 is arranged on the bottom face of the storing container 81 formed by ceramic, etc., and is electrically connected to unillustrated wiring formed in the storing container 81 by a wire 85 of Au, etc. The IC 84 includes a driving circuit for operating and vibrating the vibrating gyro element 1, and a detecting circuit for detecting the detecting vibration caused in the vibrating gyro element 1 when the angular velocity is applied. In the vibrating gyro element 1, a support base 82 formed in the storing container 81, and support portions 22a, 22b of the vibrating gyro element 1 are adhered and supported through a fixing member 83 such as an electrically conductive adhesive, etc. Further, unillustrated wiring is formed on the surface of the support base 82, and the electrode of the vibrating gyro element 1 and the wiring are conducted through the fixing member 83. This fixing member 83 is desirably constructed by a material having elasticity. An electrically conductive adhesive, etc. having silicon as a base material are known as the fixing member 83 having elasticity. The interior of the storing container 81 is held in the atmosphere of a vacuum in the upper portion of the storing container 81, and is sealed by the cover body 86.

As mentioned above, in the vibrating gyro element 1 and the support structure of the vibrating gyro element 1 in this embodiment mode, the areas of the support portions 22a, 22b can be largely secured by forming the support portions 22a, 22b for connecting the beams 20a, 20b, 21a, 21b extended out of the base portion 10. Thus, support strength can be improved.

Further, since the beams 20a, 20b, 21a, 21b extended out of the base portion 10 are formed by crystal, elasticity is provided and no vibration of the peripheral portion of the base portion 10 is suppressed, and no detecting sensitivity of the angular velocity is reduced.

Further, the vibrating gyro element 1 can be made compact by arranging the support portions 22a, 22b outside the vibrating arms 11a, 11b for detection between the vibrating arms 14a, 14b, 15a, 15b for driving in the extending-out directions of the vibrating arms 11a, 11b for detection.

Further, since the pair of support portions 22a, 22b are arranged in positions of rotation symmetry with respect to the gravity center G of the vibrating gyro element 1, the balance of the vibrating gyro element 1 can be secured and a stable posture can be held and preferable characteristics can be obtained.

Further, in the support structure of the vibrating gyro element 1, the fixing member 83 is constructed by a material having elasticity. Therefore, a vibration and an impact from the exterior can be relaxed, and the driving vibration and the detecting vibration can be stably held. With respect to a micro vibration coming to be leaked to the support portions 22a, 22b, the fixing member 83 functions as a buffer material and an influence onto the driving vibration and the detecting vibration can be reduced.

Further, the gyro sensor 80 mounting the vibrating gyro element 1 supported by the above support structure can be made compact while maintaining the detecting sensitivity of the angular velocity.

Modified Examples of Vibrating Gyro Element

FIGS. 5 to 9 are schematic plan views showing modified examples of the vibrating gyro element. These modified examples have features in the shapes of the beam and the support portion shown in FIG. 1, and the same constructional portions as FIG. 1 are designated by the same reference numerals, and their explanations are omitted.

Figure 5:
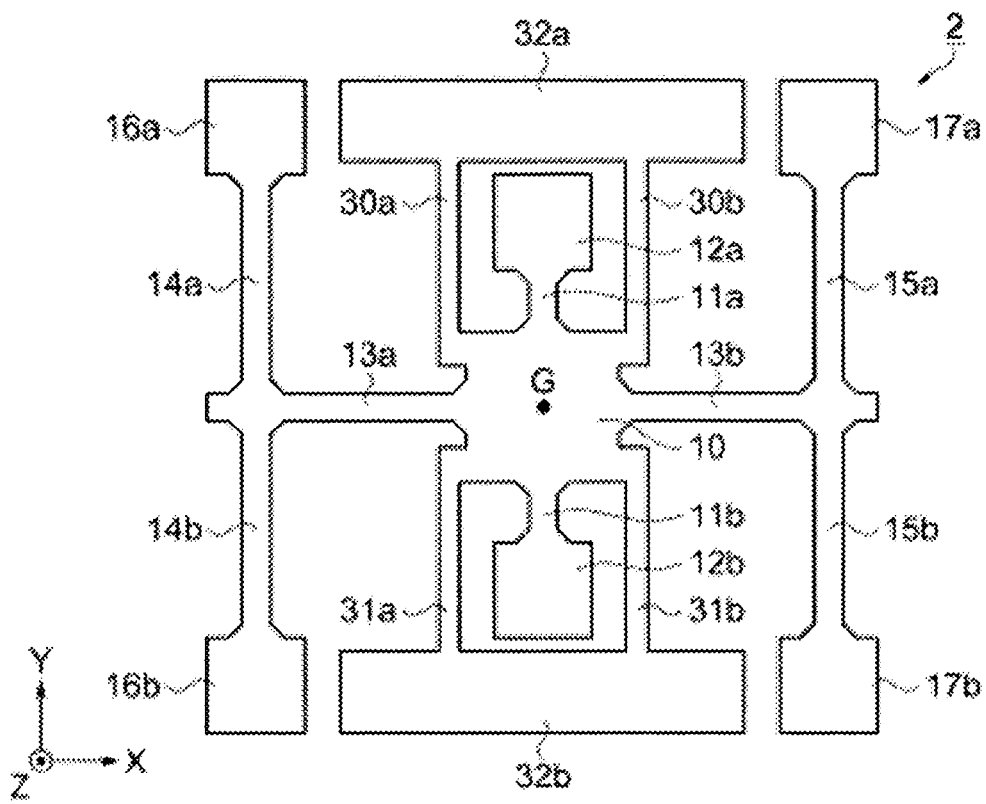
FIG. 5 is a schematic plan view showing a modified example of the vibrating gyro element.

In FIG. 5, a pair of beams 30a, 30b extended out of both sides of the base portion 10 of a vibrating gyro element 2 in parallel with the vibrating arm 11a for detection are formed. The tips of the beams 30a, 30b are connected to a support portion 32a. Similarly, a pair of beams 31a, 31b extended out of both the sides of the base portion 10 in parallel with the vibrating arm 11b for detection are formed. The tips of the beams 31a, 31b are connected to a support portion 32b.

This pair of beams 31a, 31b are arranged outside the vibrating arms 11a, 11b for detection between the vibrating arms 14a, 14b, 15a, 15b for driving in the extending-out directions of the respective vibrating arms 11a, 11b for detection.

The vibrating gyro element 2 has a support structure similar to that of the above embodiment mode, and the support portions 32a, 32b are adhered and supported in a support base by a fixing member such as an electrically conductive adhesive, etc.

Figure 6:
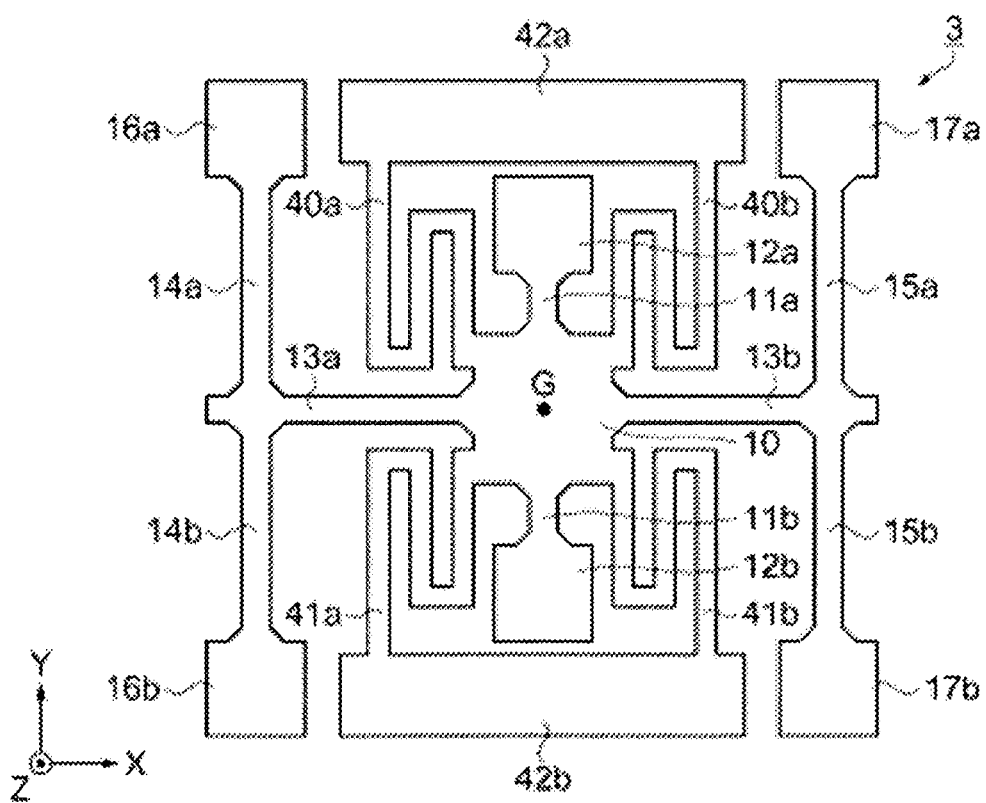
FIG. 6 is a schematic plan view showing a modified example of the vibrating gyro element.

Next, in FIG. 6, beams 40a, 40b, 41a, 41b of about an S-shape are arranged in a vibrating gyro element 3 so as to be once extended out of the corner portions of four places of the base portion 10 in the extending-out directions of the respective vibrating arms 11a, 11b for detection. The tips of the beams 40a, 40b are connected to a support portion 42a, and the beams 41a, 41b are connected to a support portion 42b.

This pair of support portions 41a, 41b are arranged outside the vibrating arms 11a, 11b for detection between the vibrating arms 14a, 14b, 15a, 15b for driving in the extending-out directions of the respective vibrating arms 11a, 11b for detection.

The vibrating gyro element 3 has a support structure similar to that of the above embodiment mode, and the support portions 42a, 42b are adhered and supported in a support base by a fixing member such as an electrically conductive adhesive, etc.

Figure 7:
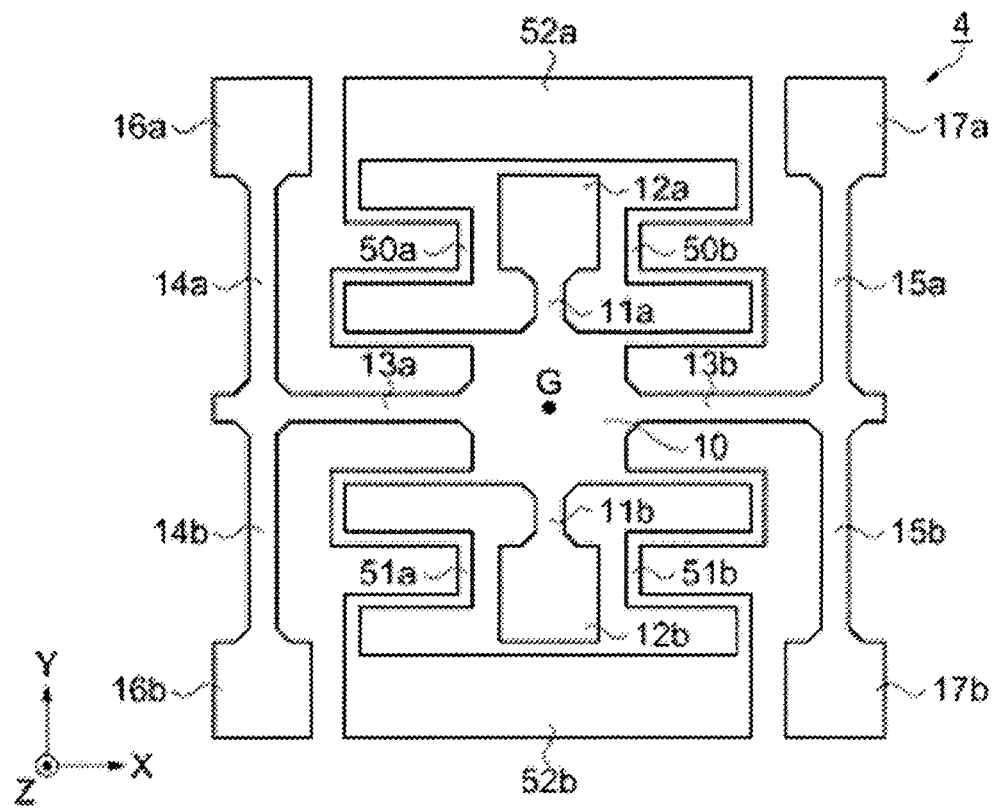
FIG. 7 is a schematic plan view showing a modified example of the vibrating gyro element.

In FIG. 7, beams 50a, 50b, 51a, 51b of about an S-shape are arranged in a vibrating gyro element 4 so as to be once extended out of the corner portions of four places of the base portion 10 in directions perpendicular to the respective vibrating arms 11a, 11b for detection. The tips of the beams 50a, 50b are connected to a support portion 52a, and the beams 51a, 51b are connected to a support portion 52b.

This pair of support portions 51a, 51b are arranged outside the vibrating arms 11a, 11b for detection between the vibrating arms 14a, 14b, 15a, 15b for driving in the extending-out directions of the respective vibrating arms 11a, 11b for detection.

Figure 8:
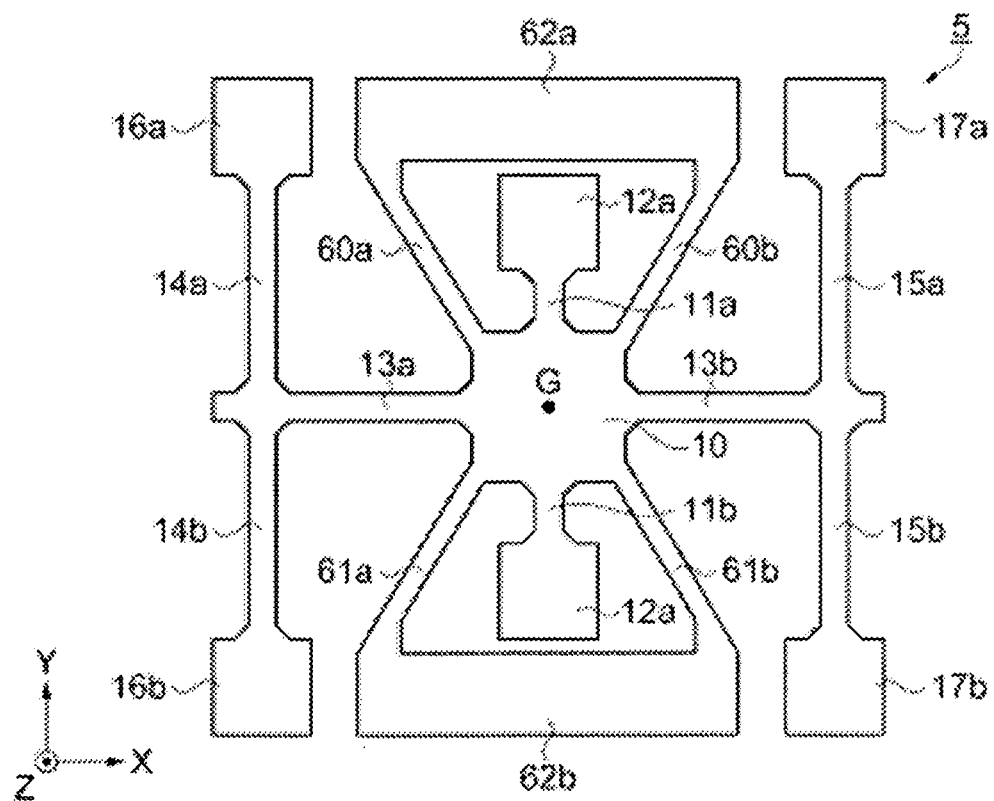
FIG. 8 is a schematic plan view showing a modified example of the vibrating gyro element.

Next, in FIG. 8, beams 60a, 60b, 61a, 61b are arranged in a vibrating gyro element 5 so as to be extended out of the corner portions of four places of the base portion 10 in a slanting direction. The tips of the beams 60a, 60b are connected to a support portion 62a, and the beams 61a, 61b are connected to a support portion 62b.

This pair of support portions 61a, 61b are arranged outside the vibrating arms 11a, 11b for detection between the vibrating arms 14a, 14b, 15a, 15b for driving in the extending-out directions of the respective vibrating arms 11a, 11b for detection.

The vibrating gyro element 5 has a support structure similar to that of the above embodiment mode, and the support portions 62a, 62b are adhered and supported in a support base by a fixing member such as an electrically conductive adhesive, etc.

FIG. 9 shows a mode in which no weight portions 16a, 16b, 17a, 17b are arranged in the vibrating gyro element 1 explained in FIG. 1.

Beams 70a, 70b, 71a, 71b of an L-shape are arranged in a vibrating gyro element 6 so as to be extended out of the corner portions of four places of the base portion 10 on both the left and right sides within FIG. 9 in directions perpendicular to the vibrating arms 11a, 11b for detection, and be intermediately extended out in parallel with the vibrating arms 11a, 11b for detection. The tips of the beams 70a, 70b are connected to a support portion 72a, and the beams 71a, 71b are connected to a support portion 72b.

This pair of support portions 71a, 71b are arranged outside the vibrating arms 11a, 11b for detection between the vibrating arms 14a, 14b, 15a, 15b for driving in the extending-out directions of the respective vibrating arms 11a, 11b for detection.

The vibrating gyro element 6 has a support structure similar to that of the above embodiment mode, and the support portions 72a, 72b are adhered and supported in a support base by a fixing member such as an electrically conductive adhesive, etc.

Thus, although the crystal as a material of the vibrating gyro element has a proper elastic property, the elastic property of the beam can be adjusted by suitably changing the length and shape of the beam extended out of the base portion 10. Thus, it is restrained to transmit the vibration of the base portion 10 to the support portion, and stable driving vibration and detecting vibration can be obtained.

Actions similar to those explained in this embodiment mode are also provided and similar effects can be also obtained in the above modified examples of the vibrating gyro element.

The vibrating gyro element of this embodiment mode can be integrally formed by etching processing using a photolithography technique, and many vibrating gyro elements can be formed from one crystal wafer.

Lithium tantalate (LiTaO$_3$) or lithium niobate (LiNbO$_5$), etc. as another piezoelectric material may be also utilized as the material of the vibrating gyro element. Further, the vibrating gyro element can be also embodied by using a perpetuating elastic material represented by an elinvar material as well as the piezoelectric material.

The entire disclosure of Japanese Patent Application No. 2005-012418, filed Jan. 20, 2005 is expressly incorporated by reference herein.

What is claimed is:

1. A vibrating gyro element comprising in the same plane:
    a base portion having opposite ends with opposite corners on each of the opposite ends and having opposite sides;
    a pair of vibrating arms for detection extended out of the base portion on both ends in a straight line shape;
    a pair of connecting arms extended-out from the base portion from said opposite sides in directions perpendicular to the vibrating arms for detection;
    additional pairs of vibrating arms for driving with each pair extending out from a tip portion of each of the connecting arms to both sides of the base portion;
    two pairs of beams with each pair extended out from the opposite corners of each opposite end of the base portion with each beam having a configuration substantially conforming to the letter "S" for driving in the extended out directions of the respective pair of vibrating arms for detection; and
    a pair of support portions with each support portion connecting a pair of beams extending from one opposite end of said base portion;
    wherein each support portion is arranged outside each of said pair of vibrating arms for detection and is arranged between each of the pairs of the vibrating arms for driving in the extended-out direction of each of the vibrating arms for detection.

2. The vibrating gyro element according to claim 1, wherein the length of each vibrating arm for detection is formed so as to be shorter than the length of each vibrating arm for driving.

3. The vibrating gyro element according to claim 1, wherein the pair of support portions are arranged in positions of rotation symmetry with respect to the center of gravity of the vibrating gyro element.

4. A support structure of a vibrating gyro element comprising:
    the vibrating gyro element according to claim 1;
    a support base for placing the vibrating gyro element thereon; and
    a fixing member for fixing each the support portion of the vibrating gyro element and the support base.

5. The support structure of the vibrating gyro element according to claim 4, wherein the fixing member is constructed by a material having elasticity.

6. A gyro sensor comprising:
    the vibrating gyro element according to claim 1;
    a support base for placing the vibrating gyro element thereon;
    a fixing member for fixing each support portion of the vibrating gyro element and the support base;
    a driving circuit for operating and vibrating the vibrating gyro element; and
    a detecting circuit for detecting a detecting vibration caused in the vibrating gyro element when an angular velocity is applied to the vibrating gyro element.

7. A vibrating gyro element comprising in the same plane:
    a base portion having opposite ends with opposite corners on each of the opposite ends and having opposite sides;
    a pair of vibrating arms for detection extended out of the base portion on both ends in a straight line shape;
    a pair of connecting arms extended-out from the base portion from said opposite sides in directions perpendicular to the vibrating arms for detection;

additional pairs of vibrating arms for driving with each pair extending out from a tip portion of each of the connecting arms to both sides of the base portion;

two pairs of beams with each pair extended out from the opposite corners of each opposite end of the base portion for detection with each beam having a configuration substantially conforming to the letter "S" in directions perpendicular to the respective pair of vibrating arms for detection; and a pair of support portions with each support portion connecting a pair of beams extending from one opposite end of said base portion;

wherein each support portion is arranged outside each of said pair of vibrating arms for detection and is arranged between each of the pairs of the vibrating arms for driving in the extended-out direction of each vibrating arm for detection.

* * * * *